United States Patent
Ryou et al.

(10) Patent No.: US 8,071,240 B2
(45) Date of Patent: Dec. 6, 2011

(54) HEATING DEVICE FOR A BATTERY AND BATTERY ASSEMBLY HAVING THE SAME

(75) Inventors: Byung Hoon Ryou, Seoul (KR); Jae Kyung Kong, Seoul (KR)

(73) Assignee: E.M.W. Energy Co., Ltd., Seoul (KR)

( * ) Notice: Subject to any disclaimer, the term of this patent is extended or adjusted under 35 U.S.C. 154(b) by 0 days.

(21) Appl. No.: 12/864,225

(22) PCT Filed: Jan. 22, 2009

(86) PCT No.: PCT/KR2009/000344
§ 371 (c)(1),
(2), (4) Date: Jul. 22, 2010

(87) PCT Pub. No.: WO2009/093854
PCT Pub. Date: Jul. 30, 2009

(65) Prior Publication Data
US 2010/0297487 A1 Nov. 25, 2010

(30) Foreign Application Priority Data
Jan. 25, 2008 (KR) .......................... 10-2008-0008167

(51) Int. Cl.
*H01M 8/02* (2006.01)

(52) U.S. Cl. ....................... 429/406; 429/403

(58) Field of Classification Search .................. 429/120, 429/403
See application file for complete search history.

(56) References Cited

U.S. PATENT DOCUMENTS

| 5,372,691 A * | 12/1994 | Kao et al. ....................... 204/265 |
| 5,422,196 A * | 6/1995 | Klein ............................. 429/402 |
| 6,365,296 B1 * | 4/2002 | Young ............................. 429/82 |
| 2006/0166097 A1 * | 7/2006 | Fujiwara ................... 429/231.95 |

FOREIGN PATENT DOCUMENTS

| JP | 58-082473 | 5/1983 |
| JP | 04-010366 | 1/1992 |
| KR | 10-0658254 | 12/2006 |

OTHER PUBLICATIONS

Linden, D.; Reddy, T.B. (2002). Handbook of Batteries (3rd Edition). McGraw-Hill, chapter 13.2.*
PCT International Search Report for PCT Counterpart Application No. PCT/KR2009/000344 containing Communication relating to the Results of the Partial International Search Report, 2 pgs., (Sep. 25, 2009).
Written Opinion of the International Search Authority for PCT Counterpart Application No. PCT/KR2009/000344, 5 pgs (Sep. 25, 2009).

* cited by examiner

*Primary Examiner* — John S Maples
(74) *Attorney, Agent, or Firm* — Blakely, Sokoloff, Taylor & Zafman LLP

(57) ABSTRACT

Disclosed are a heat-generating device for a battery and a battery assembly enabling a battery to stably produce electricity even under low-temperature conditions. The heat-generating device for a battery includes a heating element positioned on one side of the battery and generates heat through a reaction with the air. The heating element comprises a main body generating heat through the reaction with the air, and a supporting body wrapping the main body to adhere to the battery. Accordingly, the internal temperature of the battery can be maintained within possible activation temperature ranges to allow the battery to produce electricity, thereby making the battery performance sustainable under low-temperature conditions.

6 Claims, 3 Drawing Sheets

[Fig. 1]
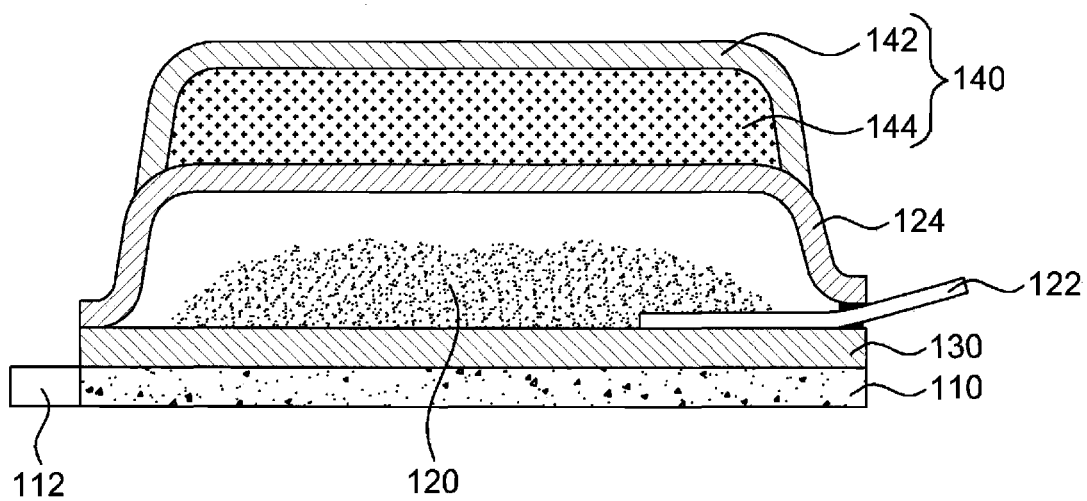

[Fig. 2]
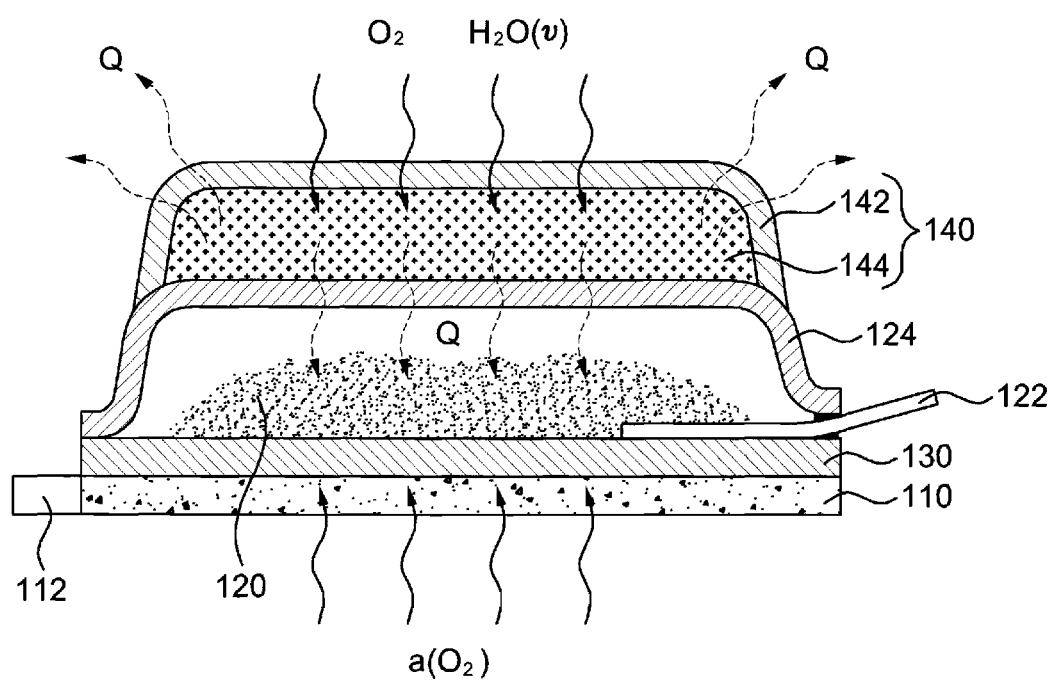

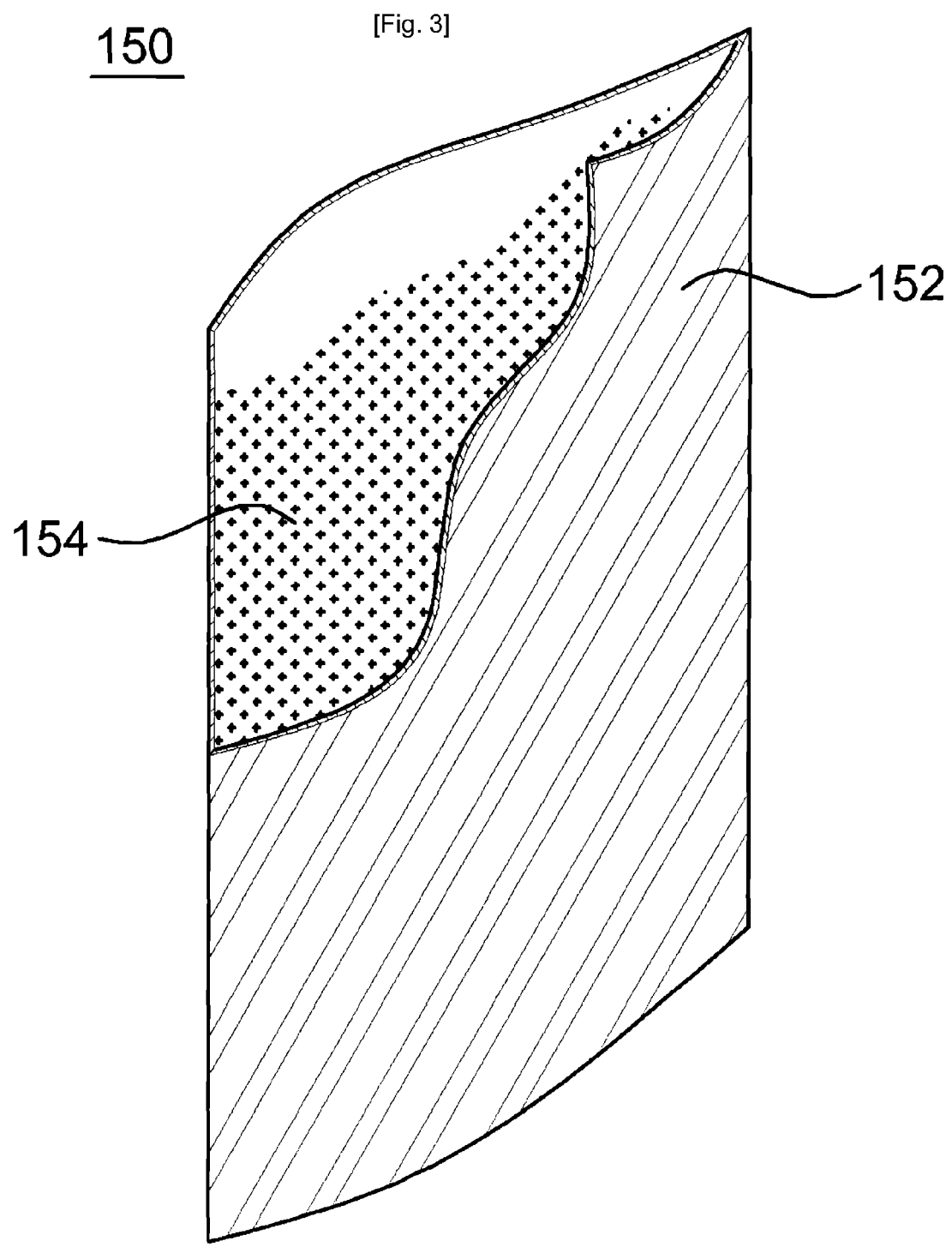
[Fig. 3]

US 8,071,240 B2

HEATING DEVICE FOR A BATTERY AND BATTERY ASSEMBLY HAVING THE SAME

CROSS-REFERENCE TO RELATED APPLICATIONS

This patent application is a U.S. National Phase application under 35 U.S.C. §371 of International Application No. PCT/KR2009/000344, filed on Jan. 22, 2009, entitled HEAT-GENERATING DEVICE FOR BATTERY AND BATTERY ASSEMBLY INCLUDING SAME, which claims priority to Korean patent application number 10-2008-0008167, filed Jan. 25, 2008.

TECHNICAL FIELD

The present invention relates to a heat-generating device for a battery and a battery assembly and, more particularly, to a heat-generating device for a battery maintaining the activation of the battery even at low temperature conditions and a battery assembly including the same.

BACKGROUND ART

There is a tendency that recent electronic devices are gradually reduced in size so that they can be easily carried. Furthermore, users require more functions. In order to meet the requirements of the users, the electronic devices are being developed to perform more functions. In order to carry the devices for a long term and also receive various contents, a battery supplying electric power to the electronic devices must have an excellent performance. One of the batteries developed in line with the needs is air-metal batteries. The air-metal batteries are advantages in that they can supply a higher voltage and have a high energy density and a great discharge capacity, as compared with common manganese batteries and common alkali-manganese batteries.

In general, batteries can perform their own functions at a certain temperature or higher. This because if temperature is low, the activation ability of internal materials of the battery is low, with the result that the performance of the battery to generate electricity is sharply reduced.

Accordingly, there is a need for a technique for maintaining the temperature of internal materials of a battery within activation temperature ranges in order for the battery to exhibit its performance even at certain temperature conditions.

SUMMARY

The present invention has been made in view of the above problems, and an object of the present invention is to provide a heat-generating device for a battery, which is capable of activating the internal materials of the battery even at low temperature using heat generated within the battery, and a battery assembly including the same.

Another object of the present invention is to provide a heat-generating device for a battery, in which materials to emit heat through a reaction with air are used and air introduced into the battery functioning as the anode can be used, and a battery assembly including the same.

To achieve the above objects, in accordance with preferred embodiments of the present invention, a heat-generating device for a battery according to the present invention can maintain temperature at which the battery can be activated.

The heat-generating device can include a heat-generating unit positioned on one side of the battery and configured to generate heat through a reaction with air.

More particularly, the heat-generating unit can include a heating element generating the heat through the reaction with the air and a main body wrapping the heating element and supporting the heating element so that the heating element is closely adhered to the battery.

The main body can be made of an air-permeable material through which the air passes. Further, the heating element can be made of any one of metal, metallic salt, and its derivatives which react with oxygen or water. Furthermore, the heating element can be constructed in a powder form.

Meanwhile, the heating element of the present invention can maintain the internal temperature of the battery at 30 to 60° C.

The heat-generating unit preferably is positioned on the opposite side of a cathode unit in the battery, but not limited thereto.

Furthermore, the heat-generating unit can include a heating element formed in a powder form and configured to generate the heat through the reaction with the air and a main body configured to include the heating element therein and detachably coupled to the battery.

Further, a battery assembly of the present invention includes a cathode unit configured to include a cathode terminal, an anode unit configured to include an anode terminal, and a heat-generating unit positioned on an opposite side of the cathode unit and configured to generate heat through a reaction with air. The heat-generating unit can control the cathode unit and the anode unit so that they reach or maintain an activation temperature condition.

The cathode unit can accommodate the air and generate hydration ions, and the anode unit can include zinc reacting with the hydration ions and generate electrons.

As described above, in accordance with the present invention, the heat-generating unit for generating heat within the internal space of the battery assembly is included. Accordingly, there is an advantage in that the temperature of an internal space of the battery can be maintained so that electricity can be generated at low temperature conditions.

Furthermore, in the case in which heating elements to react with air are disposed in an air-metal battery, including a cathode unit to bring into contact with and react with air and an anode unit to react with hydration ions and generate electrons, there are advantages in that an additional construction for supplying air is not necessary and thus installation is convenient.

DESCRIPTION OF DRAWINGS

FIG. 1 is a cross-sectional view showing a battery assembly equipped with a heat-generating device for a battery according to the present invention;

FIG. 2 is a diagram illustrating an operation of generating heat and electric power according to the introduction of air in FIG. 1; and FIG. 3 is a modification example of a heat-generating unit and is a perspective view of the heat-generating unit constructed in the form of a pocket.

DESCRIPTION OF REFERENCE NUMERALS OF PRINCIPAL ELEMENTS IN THE DRAWINGS

| 100: | battery assembly |
| 110: | cathode unit |
| 112: | cathode terminal |

-continued

| 120: | anode unit |
| --- | --- |
| 122: | anode terminal |
| 130: | separator |
| 140, 150: | heat-generating unit |
| 142, 152: | main body |
| 144, 154: | heating element |

DETAILED DESCRIPTION

Preferred embodiments of the present invention are described in detail with reference to the accompanying drawings, but the present invention is not limited thereto.

FIG. 1 is a cross-sectional view showing a battery assembly equipped with a heat-generating device for a battery according to the present invention. As shown in FIG. 1, the battery assembly 100 of the present invention includes a cathode unit 110, an anode unit 120, a separator 130, and a heat-generating unit 140.

The cathode unit 110 includes a cathode terminal 112 and receives electrons via the cathode terminal 112. Furthermore, the anode unit 120 generates electrons and externally outputs the electrons through an anode terminal 122. Further, the anode unit 120 includes an anode casing 124 for protecting the anode unit 120 from the outside. It is preferred that the anode casing 124 be made of a material having a nonconductor property.

Here, the anode terminal 122 can be constructed in the form of one iron core. Furthermore, the cathode terminal 112 is formed on the side of the cathode unit 110. Meanwhile, unlike the present embodiment, the positions and forms of the anode terminal and the cathode terminal can be changed in various ways.

Here, the separator 130 is positioned between the cathode unit 110 and the anode unit 120 and configured to prevent the cathode unit 110 and the anode unit 120 from physically bringing into contact with each other. However, the movement of ions generated through a chemical reaction in the cathode unit 110 and the anode unit 120 is free. The ions can be freely moved between the cathode unit 110 and the anode unit 120 through the separator 130.

Meanwhile, the cathode unit 110 is exposed to the outside and configured to directly bring into contact with air. The cathode unit 110 of the present embodiment can react with oxygen included in air.

The heat-generating unit 140 is positioned close to the anode unit 120. In FIG. 1, the heat-generating unit 140 is positioned on the upper side of the anode unit 120. That is, the heat-generating unit 140 is positioned to face the cathode unit 110 with the anode unit 120 interposed therebetween.

Further, the heat-generating unit 140 is made of a flexible material and able to store a pyrogen material therein. The pyrogen material refers to a material generating heat through a reaction with air. More particularly, metal, metallic salts, or its derivatives to generate heat through a reaction with oxygen or water can be used as the pyrogen material.

More particularly, the heat-generating unit 140 includes a main body 142 and a heating element 144. The main body 142 is constructed in the form of a pocket and configured to accommodate the heating element 144, made of the pyrogen material, between the inside and the outside of the anode casing 124. That is, the main body 142 can wrap the heating element 144 so that the heating element 144 is closely adhered to the anode unit 120. Here, the main body 142 can be made of an air-permeable material through which air can pass.

Meanwhile, the heating element 144 can have a variety of forms. In the present embodiment, the heating element 144 has a powder form in order to increase the efficiency of heat generated. However, the heating element is not limited to the powder form, and it can have various forms which enable easy manufacture, transportation, and handling. Further, it is preferred that calcium carbonate be used as the heating element 144. Alternatively, various materials to generate heat through a reaction with air can be used as the heating element 144.

Although as described above, the battery assembly 100 is placed at low temperature, temperature within the battery assembly 100 can maintain an activation temperature or higher at which the cathode unit 110 and the anode unit 120 can consistently generate electricity because of heat generated by the heat-generating unit 140.

Meanwhile, it is preferred that the amount of heat generated by the heat-generating unit 140 be appropriately controlled. That is, it is preferred that the internal temperature of the battery assembly 100 rise to the extent that the reaction materials of the anode unit 120 and the cathode unit 110 are not deformed by the heat generated by the heat-generating unit 140. To this end, it is preferred that the heat-generating unit 140 be controlled so that the temperature of an internal space of the battery assembly 100 is a critical temperature or lower with consideration taken of the size of the battery assembly 100, the amount of the heating element 144, and so on.

To this end, the battery assembly of the present invention can further include a temperature sensor for sensing the temperature of an internal space of the casing and a control unit for controlling the operations of the heating element on the basis of information about the temperature sensed by the temperature sensor.

Here, chemicals, natural textiles, or similar air-permeable material can be used as the main body 142. Furthermore, metal, metallic salts, or its derivatives to generate heat through a reaction with oxygen ($O_2$) or water can be used as the heating element 144.

Meanwhile, in the battery assembly 100 of the present invention, the cathode unit 110 can be formed of a constituent element configured to generate hydration ions (OH—) through a reaction with air, and the anode unit 120 can be formed of a constituent element configured to receive the hydration ions and generate electrons.

FIG. 2 is a diagram illustrating an operation of generating heat and electric power according to the introduction of air in FIG. 1.

As shown in FIG. 2, oxygen ($O_2$) included in air 'a' is supplied to the cathode unit 110, and oxygen ($O_2$) included in air or water ($H_2O$) of a vapor state is supplied to the heat-generating unit 140.

The cathode unit 110 can receive the oxygen ($O_2$) and generate hydration ions (OH—) for generating electricity. Further, the heat-generating unit 140 generates heat through a reaction with the oxygen ($O_2$) or the water ($H_2O$) of a vapor state. The heat generated by the heat-generating unit 140 is supplied to the cathode unit 110 and the anode unit 120, with the result that excellent temperature conditions can be maintained so that an oxidation-reduction reaction for generating electricity can be smoothly performed in the cathode unit 110 and the anode unit 120.

The internal temperature of the battery assembly 100 can maintain about 30 to 60° through the heat-generating unit 140.

FIG. 3 is a modification example of a heat-generating unit and is a perspective view of the heat-generating unit constructed in the form of a pocket.

As shown in FIG. 3, the heat-generating unit 150 can be constructed in the form of a pocket and to store a heating element 154 therein. Here, the heating element preferably is constructed in the form of powder or can be constructed in various forms, such as a block form.

Meanwhile, the heat-generating unit 150 can include a coupling part (not shown) for attaching it to the battery assembly (refer to 100 of FIG. 1) of the present invention. The coupling part can include an adhesive, Velcro or the like. Further, an entry part for opening a main body 152 can be formed on one side of the main body 152 so that the heating element 154 stored in the main body 152 can be replaced with a new heating element.

What is claimed is:

1. A heat-generating device for an air-metal battery in which temperature for activating the air-metal battery is maintained, the heat-generating device comprises:
    a heat-generating unit positioned on one side of the air-metal battery, wherein the heat-generating unit generates heat through a reaction with air, the heat-generating unit includes a heating element which is made of any one of metal, metallic salt, and its derivatives which react with oxygen or water, and the heating element maintains an internal temperature of the air-metal battery at 30° to 60° C.,
    a main body wrapping the heading element and supporting the heating element so that the heating element is closely adhered to the air-metal battery, wherein the heating element generates the heat through the reaction with the air, wherein the main body is made of an air-permeable material through which the air passes.

2. The heat-generating device according to claim 1, wherein the heating element is constructed in a powder form.

3. The heat-generating device according to claim 1, wherein the heat-generating unit is positioned on an opposite side of a cathode unit in the air-metal battery.

4. The heat-generating device according to claim 1, wherein the heat-generating unit comprises:
    a heating element formed in a powder form and configured to generate the heat through the reaction with the air; and
    a main body configured to include the heating element therein and detachably coupled to the air-metal battery.

5. An air-metal battery assembly, comprises:
    a cathode unit configured to include a cathode terminal;
    an anode unit configured to include an anode terminal; and
    a heat-generating unit positioned on an opposite side of the cathode unit that generates heat through a reaction with air, the heat-generating unit includes a heating element which is made of any one of metal, metallic salt, and its derivatives which react with oxygen or water, and wherein the heat-generating unit controls the cathode unit and the anode unit so that the cathode unite and the anode unit reach or maintain an activation temperature condition; and
    a main body wrapping the heading element and supporting the heating element so that the heating element is closely adhered to the air-metal battery, wherein the heating element generates the heat through the reaction with the air, wherein the main body is made of an air-permeable material through which the air passes.

6. The air-metal battery assembly according to claim 5, wherein:
    the cathode unit accommodates the air and generates hydration ions, and
    the anode unit includes zinc reacting with the hydration ions and generates electrons.

* * * * *